(12) United States Patent
Gamarino et al.

(10) Patent No.: US 12,522,883 B2
(45) Date of Patent: Jan. 13, 2026

(54) COMPOSITION AND PROCESS FOR WATERPROOFING LEATHER

(71) Applicant: Stahl International B.V., Waalwijk (NL)

(72) Inventors: Roberta Gamarino, Casale Monferrato (IT); Guoqiang Qiang, Shanghai (CN); Frédéric François Bert D'Anvers, Waalwijk (NL); Peter Danisch, Waalwijk (NL)

(73) Assignee: Stahl International B.V., Waalwijk (NL)

( * ) Notice: Subject to any disclaimer, the term of this patent is extended or adjusted under 35 U.S.C. 154(b) by 380 days.

(21) Appl. No.: 18/272,422

(22) PCT Filed: Jan. 17, 2022

(86) PCT No.: PCT/NL2022/050014
§ 371 (c)(1),
(2) Date: Jul. 14, 2023

(87) PCT Pub. No.: WO2022/154662
PCT Pub. Date: Jul. 21, 2022

(65) Prior Publication Data
US 2024/0309474 A1   Sep. 19, 2024

(30) Foreign Application Priority Data

Jan. 18, 2021 (NL) .......................... 2027334

(51) Int. Cl.
*C14C 9/02* (2006.01)

(52) U.S. Cl.
CPC ....................... *C14C 9/02* (2013.01)

(58) Field of Classification Search
CPC ............ C14C 9/02; C08G 77/14; C08L 33/08
See application file for complete search history.

(56) References Cited

FOREIGN PATENT DOCUMENTS

| EP | 1087021 A1 | 3/2001 |
| EP | 1470258 | 10/2004 |
| EP | 2646581 B1 | 10/2013 |

*Primary Examiner* — Anthony J Green
(74) *Attorney, Agent, or Firm* — Verrill Dana, LLP

(57) ABSTRACT

The present invention relates to a novel composition for waterproofing leather, hides and/or pelts comprising a carboxyl-functional polysiloxane or an epoxide-functional polysiloxane and a polymer dispersion that contains 2 to 35 weight % of carboxylic groups, preferably a polyacrylate dispersion, to obtain leather that has a good water resistance according to ISO DIN EN ISO 5403-2 and DIN EN ISO 5403-1.

21 Claims, No Drawings

COMPOSITION AND PROCESS FOR WATERPROOFING LEATHER

The present invention relates to a novel composition for waterproofing leather (the term "leather" encompassing fur skins, hides or pelts).

Leather is a durable, flexible material created via the tanning of animal rawhide and skin. The leather manufacturing process is divided into three fundamental sub-processes: preparatory stages, tanning and crusting.

The present invention relates to the sub-process of crusting, especially the waterproofing part to make the leather water repellent.

In the preparatory stages, hide or skin is prepared for tanning. After trimming, animal skin is soaked to remove salts and other solids, while restoring moisture when the skin was first dried. Then, the flesh side of the wet skin is scraped to remove any remaining traces of flesh or fat, and the skin is optionally dehaired. After an optional bating and pickling step, the skins are subjected to tanning. Other potential steps that may be part of the preparatory stages include preservation, liming, splitting, reliming, deliming, degreasing, frizzing, bleaching and depickling.

Tanning is the process of preserving the skins by soaking them in a bath for a period of time. Particularly, tanning converts the protein, and especially the collagen, of the raw hide or skin into a stable material that does not putrefy. Tanning is carried out by using either vegetable chemicals, using tannin and other ingredients derived from vegetable matter such as the bark of certain trees, by the use of chromium salts (giving so-called wet-blue leather), by the use of aldehydes (resulting in wet-white leather), by the use of organic reactive tanning agent (resulting in wet white leather), by use of synthetic tannins (syntans), or other conventional techniques. The product prepared in this sub-process is called "pretanned leather".

As said, the present invention focuses on the sub-process of crusting, and especially on the waterproofing part thereof. Crusting is the process wherein the hide or skin is thinned, retanned, and lubricated, and often a colouring operation is included in the crusting sub-process. Any chemicals used or added during crusting must be fixed in place. The crusting process ends with drying and softening operations. This description of the crusting process is not complete; crusting may also include wetting back, sammying, splitting, shaving, rechroming, neutralization, filling, stuffing, stripping, whitening, fixating, setting, conditioning, milling, staking and buffing.

The chemical aspects of the crusting process at least encompass re-tanning (optionally following neutralization, especially after chrome-tanning) and fatliquoring. Usually in the preparation of leather from pre-tanned hides, the re-tanning and fatliquoring is done in separate steps.

Collagen-containing material, and thus the skins used as the raw material for leather production, contains a certain proportion of ionisable and non-ionisable functional groups. In the course of the leather production process, the proportion of these groups changes depending on the chemicals used. For example, in the case of chrome tanning, the proportion of acidic carboxyl groups is reduced. If vegetable tannins are used for tanning, then the proportion of hydroxyl groups increases owing to the hydroxyl groups present in the vegetable tannins. Because of the natural origin of collagen-containing material and a large number of different leather chemicals, which can be used within the context of the leather production process, it is not possible to give a universally applicable indication of the proportions of the functional groups that are present.

Leather is mainly used in the shoe and clothing industry, in the automotive industry and in the furniture industry. In the mentioned fields of application, leather is increasingly required to be water-repellent, meaning to have a high resistance to the penetration of water. Unfortunately, leather, in particular vegetable-tanned leather, is hydrophilic, so that the required water-repellent properties represent a major challenge for the leather industry. The treatment of leather, furs, textiles and other fibrous materials to impart hydrophobicity, often referred to as waterproofing, is common. In particular waterproofing leather is desirable in the manufacture of high quality footwear, clothing or furnishings. In order to improve the water-repellent properties of leather, it is already known to introduce hydrophobic substances such as oils, fats, waxes, paraffins, fluorocarbons, silicones and hydrophobized polymers into the leather structure.

U.S. Pat. No. 2,964,425 describes the use of organic sarcosines, with long aliphatic chains, in leather waterproofing.

NL 301058 discloses a fat liquoring salt composition of a hydroxylated polydimethylsiloxane, aminoalkyltrialkoxysilane, glacial acetic acid and isopropyl alcohol in the treatment of making the leather soft and hydrophobic.

EP 213480 describes a process for waterproofing leather and skins with a silicone oil and the salt of an N—(C9-C20-acyl)-amino acid as an emulsifier for the silicone oil, which is carried out in the aqueous phase during or after retanning, and the use of salts of N-acylamino acids as emulsifiers for silicone oils in the waterproofing of leather and skins in the aqueous phase.

EP 324345 describes leather waterproofing with emulsions of siloxanes having terminal carboxylic anydride groups, whereby the anhydride groups are hydrolysed and neutralized by an alkali or nitrogen base. A disadvantage of terminal groups is that there are only two of said groups in a siloxane polymer if the siloxane polymer is fully linear.

EP 745141 describes leather waterproofing with emulsions of linear siloxanes with organofunctional carboxy groups, whereby the carboxy groups are separated from the siloxane backbone by a $C_5$-$C_{25}$ organic spacer group, but chromium sulphate is used in the process.

EP 757108 describes leather waterproofing with an aqueous dispersion of a silicone oil emulsified with a water-insoluble amphiphilic copolymer, but chromium sulphate is used in the process.

EP 938590 describes leather waterproofing with carboxy-amide-functional polyorganosiloxanes, but chromium sulphate is used in the process.

DE 19707970 describes the synthesis of carboxyl-functional polysiloxanes and the use of them on leather, but the sidegroups containing the carboxylic group are attached via an amido-bond. An amido-bond is hydrophilic in nature and this may result in less effectiveness when waterproofing of leather is desired.

EP 1087021 describes leather waterproofing with an organic oil or wax, an amphiphilic copolymer, an anionic surfactant and a carboxyl functional polysiloxane, which is in neutralized form, but chromium sulphate is used in the process.

EP 1108765 describes leather waterproofing with emulsions of specific organofunctional siloxanes with carboxy groups together with an anionic copolymer, wherein the carboxyl functions are connected to the polysiloxane via an amino-functional-hydrocarbon spacer. An amino-functional spacer is hydrophilic in nature and this may result in less effectiveness when waterproofing of leather is desired.

EP 1416057, U.S. Pat. Nos. 7,060,363, 7,208,016 describe chromium-free tanning and fatliquoring of iron-tanned leather with organofunctional siloxanes, including carboxyfunctional siloxanes. However, the leather made according to this process is always red, due to the use of iron-tanned leather and no indication is provided that the process would also work on leathers that are otherwise tanned.

GB 2375547 describes waterproofing leather by the use of a crosslinking THP-salt and an aminofunctional silicone.

EP 1470258 discloses compositions comprising a natural oil or a wax, together with an anionic surfactant, a carboxylic functional hydrocarbon and a liquid polysiloxane substituted with various functional groups such as COOH, OH, SH or epoxide, but chromium sulphate is used in the process.

EP 1597402 describes the use of a mixture of dispersions of polysiloxanes, with at least one polysiloxane having carboxyl groups and at least one polysiloxane without carboxyl groups, and an emulsifier, for waterproofing leather, but chromium sulphate is used in the process.

EP 1445273, U.S. Pat. No. 7,026,499 describe leather waterproofing with polysiloxanes having terminal carboxylic groups. A disadvantage of terminal groups is that there are only two of such groups in a siloxane polymer if the siloxane polymer is fully linear and hence the polysiloxanes have a lower loading of carboxylic groups.

EP 1914261 describes phosphated organo-siloxanyl derivatives and their use for treating leather.

EP 2576660 describes the use of polyorganosiloxanes with 1,3-dihydroxyalkyl functional groups on Si—C-bonded hydrocarbon radicals as waterproofing agents.

EP 2646581 describes the use of a mixture of an amphiphilic organic copolymer, at least one silicone compound having at least one carboxylic acid group, an emulsifier having at least one phosphorus atom per molecule, at least one N-acylated amino acids, at least one surface-active compound comprising at least one $C_{10}$-$C_{30}$-alkyl radical, branched or unbranched, or at least one polyisobutene moiety, and at least one ionic or aqueous-ionizable group, other than the amphiphilic copolymer, wherein the aqueous float is free of waxes and oils, for waterproofing leather, but chromium sulphate is used in the process.

EP 891430 describes the use of copolymers of dicarboxylic acid (anhydrides), (maleic anhydride) and lower olefins (isobutene) and hydrophobic comonomers ($C_{20}$-$C_{24}$-olefins) for waterproofing leather, also in combination with paraffin water repellents or silicone water repellents. These combinations display their full water repellency effect only after fixation with mineral salts, in particular with chromium salts.

The patents EP 745141, EP 757108, EP 938590, EP 1087021, EP 1470258, EP 1597402 and EP 2646581 described above wherein polysiloxanes having carboxyl groups are mentioned use a metal salt for capping and fixation, wherein the metal salt is often the industry standard chromium sulphate. The use of such metal salts, and especially chromium sulphate, is undesired, as these salts may come in the effluent, when water treatment is not sufficient. Furthermore, even when water treatment can remove such metal salts from the effluent, then it is still desirable not needing such metal salts, because this would ease the water treatment and the associated waste streams.

The patents EP 324345, EP 1108765 and U.S. Pat. No. 7,026,499 described above wherein polysiloxanes having carboxyl groups are mentioned do not use a metal salt for capping and fixation, but the polysiloxanes described in these patents are very specific types of polysiloxanes, due to the location of the carboxylic group at the ends of the polysiloxane chains, which has as disadvantage that there are only two terminal carboxylic groups possible in such polysiloxane polymers, or due to the amino-functional-hydrocarbon spacer that is between the carboxylic groups and the polysiloxane chain, which results in the presence of an hydrophilic group, which may result in less effectiveness when waterproofing of leather is desired.

There are two test methods, which allow assessing the waterproofing properties of leather: Maeser and Bally Penetrometer tests.

The Maeser tests according to DIN EN ISO 5403-2 specify a method for determining the dynamic water resistance of leather by means of repeated angular compression. It is applicable to all flexible leathers but is particularly suitable for leathers intended for footwear applications. A square test specimen is folded and secured in two V-shaped clamps, which have closed ends so as to form a trough. The trough is then immersed in water and the clamp at one end oscillates at a constant speed so that the specimen is repeatedly flexed. The test is stopped at the first sign of water penetration through the test specimen. The penetration of water is expressed as the number of cycles after which the water penetration is noted visually or electronically.

The Bally Penetrometer tests according to DIN EN ISO 5403-1 specify a method for determination of water resistance of flexible leather by means of repeated linear compression. It is applicable to all flexible leathers but is particularly suitable for leathers intended for footwear applications. A test piece is formed into the shape of a trough and flexed while partially immersed in water. The time taken for water to penetrate through the test piece is measured. The method also allows for the percentage mass of the water absorbed and the mass of the water transmitted through the test piece to be determined.

The present invention provides a process to waterproof leather wherein no metal salts, such as chromium sulphate, are used or needed particularly as capping agent.

In conventional processes, the skins are capped to remove or inactivate emulsifying agents. Capping typically involves the introduction of a metal salt that interacts with the emulsifying agent rendering it inactive by forming a complex with the metal ion. The formation of such a complex will also occur with waterproofing agents to have them fixated into the leather fibres. The metal salt that is used most often in industry is chromium sulphate. Although capping can improve the overall performance of the finished leather, it can have a number of disadvantages. For example, capping can cause the leather to shrink, thereby reducing the yield. Also, capping can have a negative impact on the ability of the leather to readily and uniformly accept colouring and dyes. In fact, capping can make it nearly impossible to obtain certain colours, especially with bright colours, which have a tendency to more clearly show any discontinuity in colour. In general, capping of waterproofing agents by the use of organic acids, such as formic acid, has hitherto been unsuccessful because the obtained waterproofing properties achieved are then not sufficient.

It has been surprisingly found that using polysiloxanes which have carboxylic side groups and/or epoxide side groups and that may have some degree of branching in particular if carboxylic side groups are present in combination with a polymer dispersion containing 2 to 35 weight % and preferably 5 to 25 weight % of carboxylic groups, preferably a polyacrylate dispersion containing 2 to 35 weight % and preferably 5 to 25 weight % of carboxylic groups, for the treatment of leather results in good water resistance of the treated leather, while capping with metal salts is not needed.

The present invention provides a waterproofing composition using polysiloxanes that have preferably some degree of branching and which have carboxylic side groups and/or epoxide side groups in combination with a polymer dispersion that contains 2 to 35 weight % of carboxylic groups that results in good water resistance according to ISO DIN EN ISO 5403-2 and DIN EN ISO 5403-1 after application on leather, while other properties of the leather, such as suppleness, tear strength, touch and feel aspects, remain good and are not deteriorated and wherein no metal salts are needed during the capping step. In the context of the present invention, a good water resistance according to ISO DIN EN ISO 5403-2 and DIN EN ISO 5403-1 means a minimum of 15.000 flexes according to ISO DIN EN ISO 5403-2, a minimum of 6 hours and a maximum water uptake of 25% according to DIN EN ISO 5403-1. The carboxylic or epoxide groups are present as side groups within the polysiloxane chain and not as terminal group at the end of the polysiloxane chain. Carboxylic groups or epoxide groups present as side groups are more effective (i.e. show better waterproofing effect) than such groups being present as terminal groups. Also with side groups lower amounts of the polysiloxanes are needed to obtain the same waterproofing effect. The carboxylic groups or epoxide groups are thought to react, or form a complex, with the chromium ions in the leather. When the carboxylic group or epoxide group is present as side chain then the result is that there are effectively two polysiloxane hydrophobic tails attached to the chromium center in the leather, whereas with terminal carboxylic or epoxide groups the result would only be one polysiloxane hydrophobic tail attached to the chromium center in the leather.

Hence, in a first aspect, the present invention relates to a composition for treatment of leather comprising
(A) a polydiorganosiloxane that may have some degree of branching and which has carboxylic side groups and/or epoxide side groups
(B) at least one polymer dispersion that contains 2 to 35 weight % of carboxylic groups
(C) optionally one or more emulsifiers
(D) optionally one or more plasticizers or organic solvents and
(E) optionally additional water.

In particular the present invention relates to a composition for treatment of leather comprising
(A) a polydiorganosiloxane having units of the general formula (I)

wherein the substituents $R^1$ are hydrogen atoms or identical or different $C_1$- to $C_{18}$-hydrocarbon radicals which are optionally substituted by fluorine, chlorine or bromine atoms or cyano groups and are optionally interrupted by the groups —O— or —S— or additional polyoxyalkylene groups, $R^2$ are $C_1$- to $C_{12}$-alkoxy radicals or hydroxyl radicals, the substituents Q are identical or different monovalent groups of the formula (II)

wherein Z is a carboxyl group or an epoxide group, and wherein the substituents $R^3$ are hydrogen atoms or identical or different monovalent $C_1$- to $C_{10}$-hydrocarbon radicals which are optionally substituted by fluorine, chlorine or bromine atoms,
the substituent $R^4$ is a divalent $C_1$- to $C_{18}$-hydrocarbon radical which is optionally substituted by fluorine, chlorine or bromine atoms or cyano groups and optionally interrupted by the groups —O— or —S— or additional polyoxyalkylene groups,
a has the values 0, 1, 2 or 3 and b has the values 0, 1, 2 or 3 and c has the values 0, 1, 2 or 3 and the sum of a+b+c is not more than 3
(B) at least one dispersion of a polymer that contains 2 to 35 weight % of carboxylic groups
(C) optionally one or more emulsifiers
(D) optionally one or more plasticizers or organic solvents and
(E) optionally additional water with the proviso that, particularly if Z represents a carboxy group, at least 0.1 Mol % of units according to formula (I) are present in the polydiorganosiloxane, wherein a has the value 0 or 1, b has the value 0, 1, 2 or 3, c has the value 0 or 1 and $R^1$, $R^2$, $R^3$ and $R^4$ are as above defined and the sum of a+b+c is not more than 3 and the sum of a+c is not more than 1.

Polysiloxanes are to be understood as meaning polymers, which have repeating Si—O—Si units in the main chain. The remaining valences are usually saturated with hydrogen, hydroxyl, alkyl, phenyl, alkoxy, amino, mono-alkylamino, di-alkylamino, chlorine or fluorine. Amongst these, alkyl, in particular $C_1$-$C_3$-alkyl, especially methyl, and also phenyl occur in most cases. Polysiloxanes usually have molecular weights ranging between 5000 and 150,000 Dalton. Polysiloxanes may also be branched. Polysiloxanes in the context of the present invention have at least one side group that comprises of an alkyl chain with a carboxylic group and/or with an epoxide group, wherein this side group is attached to the polysiloxane chain via its alkyl chain directly to the silicon of the polysiloxane chain and the polysiloxane is preferably somewhat branched, particularly when carboxylic side groups are present, as expressed in the proviso stipulation above. Preferably the carboxylic or epoxide side group is not attached to the polysiloxane chain through a aminofunctional hydrocarbon group. In the context of the present invention, a polysiloxane that is somewhat branched is meant to be a polysiloxane that is not fully linear, but at some of the silicium atoms of the polysiloxane chains there is attached a sidechain polysiloxane group. In the context of the present invention, the molecular weight of these functional polysiloxanes is preferably between 5,000 and 250,000 Dalton, and more preferably between 10,000 and 200,000 Dalton. In the context of the present invention, the amount of carboxylic groups in the polysiloxanes is preferably such that the acid value, as measured according to DIN 53402, is between 2 and 50 mg KOH/g and more preferably between 5 and 35 mg KOH/g. In the context of the present invention, the amount of epoxide groups in the polysiloxanes is preferably such that the epoxide equivalent weight is between 1000 and 10.000 and more preferably between 2000 and 8000. In epoxide chemistry, the ratio of chemicals is most often calculated by using the equivalent weight of the components, and the equivalent weight of an epoxide-polymer is calculated by dividing the molecular weight of the epoxide-polymer by the number of epoxide groups per epoxide-polymer.

Synthesis of carboxyl-functional polydimethylsiloxanes for use in the present invention has been described in literature, such as in EP 196169 and EP 675150.

In a preferred embodiment of the present invention, the composition comprises as a component (A) a branched organofunctional polydiorganosiloxane of the general formula

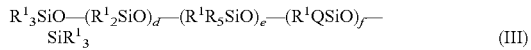
(III)

wherein $R^1$ and Q have the same meaning as above and $R^5$ has the same meaning as $R^2$ or is a group of the general formula

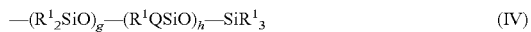
(IV)

wherein $R^1$ and Q have the same meaning as above, wherein d has integer values from 50 to 500, e has integer values of 1 to 10, f has integer values from 1 to 20, g has integer values from 50 to 500 and h has integer values from 1 to 20, with the proviso that, if Z represents a carboxyl group, at least one radical $R^5$ is represented by a group of formula (IV).

Especially preferred ranges for d, e, f, g and h are: 80 to 250 for d, 1 to 5 for e, 1 to 5 for f, 80 to 250 for g and 1 to 5 for h.

Examples of suitable polysiloxanes with epoxide-functional side chains are ECMS-127, ECM-227, ECMS-327, ECMS-924, EBP-234 (from Gelest Inc.), SLM441109 (from Wacker Chemie AG), X-22-343, KF-101, KF-1001, X-22-2000, X-22-2046, KF-102, X-22-4741, X-22-9002, KF-1005 (from Shin-Etsu Chemical Company), Silmer EP C50, Silmer EP J10 (from Siltech Corporation). Examples of suitable polysiloxanes with carboxyl-functional side chains are X-22-3701E (from Shin-Etsu Chemical Company) and SLM46038 (from Wacker Chemie AG).

Preferred polydimethylsiloxanes are those that have a low content of generally below 0.1 weight % of so-called D4 (Octamethylcyclotetrasiloxane), D5 (Decamethylcyclopentasiloxane) and D6 (Dodecamethylcyclohexasiloxane), which are cyclic monomers that the European Chemicals Agency (ECHA) has included on their EU REACH Candidate List for Substances of Very High Concern (SVHC). SVHC is a term used in Europe under the EU REACH regulations to list substances that meet certain criteria. In case of D4, D5 and D6, the EU has decided to include these substances due to existing or predicted environmental properties, as according to REACH, D4 meets the criteria for Persistent, Bioaccumulative and Toxic (PBT) substances, and D5 and D6 meet the criteria for very Persistent, very Bioaccumulative (vPvB) substances.

The at least one dispersion of a polymer, that contains 2 to 35 weight % of carboxylic groups, wherein the weight % is calculated as the fraction of weight of the COOH groups compared to the overall weight of all the monomers present in the polymer combined, can be synthesized from one monomer, but is usually synthesized from more than one monomer, and the result is then a copolymer. The at least one dispersion for use according to the invention can be a polyacrylate dispersion, a polyolefin dispersion or a polyurethane dispersion or a combination thereof. Polyacrylate dispersions, polyolefin dispersions and polyurethane dispersions are widely known. Polyacrylate dispersions, polyolefin dispersions and polyurethane dispersions of various solids levels can be used. Polyacrylate dispersions, polyolefin dispersions and polyurethane dispersions can also contain a certain amount of co-solvent. In the context of the present invention, aqueous polyacrylate dispersions are preferred. The benefit of polyacrylate dispersions is that the concentration of carboxylic groups can easily range very widely from very low to very high concentrations. In the case of e.g. polyurethane dispersions the carboxylic group concentration bandwidth is much smaller.

Preferred polymer dispersions that contain 2 to 35 weight % of carboxylic groups are polyacrylate dispersions that contain 2 to 35 weight % of carboxylic groups and more preferred are polyacrylate dispersions that contain 5 to 25 weight % of carboxylic groups. Polyacrylate dispersion are widely known and polyacrylate dispersions of various solids levels can be used and can also contain a certain amount of co-solvent. In the context of the present invention, aqueous polyacrylate dispersions are preferred that preferably have a non-volatile content of at least 10% and more preferably of at least 20%. Polyacrylates are synthesized from vinyl-functional monomers, such as (2-Boc-amino)ethyl methacrylate, (2-dimethylaminoethyl) methacrylate, (2-isobutyl-2-methyl-1,3-dioxolan-4-yl)methyl acrylate, (3-acrylamidopropyl)trimethylammonium chloride, (4-hydroxyphenyl)methacrylamide, [2-(acryloyloxy)ethyl]trimethylammonium chloride, [2-(methacryloyloxy)ethyl]dimethyl-(3-sulfopropyl)ammonium hydroxide, [2-(methacryloyloxy)ethyl]trimethylammonium chloride, [3-(methacryloylamino)propyl]trimethylammonium chloride, 1,1,1,3,3,3-hexafluoroisopropyl acrylate, 1,1,1,3,3,3-hexafluoroisopropyl methacrylate, 1,10-decanediol dimethacrylate, 1,3,5-triacryloylhexahydro-1,3,5-triazine, 1,3-butanediol diacrylate, 1,3-butanediol dimethacrylate, 1,4-butanediol diacrylate, 1,4-butanediol dimethacrylate, 1,4-phenylene dimethacrylate, 1,6-hexanediol diacrylate, 1,6-hexanediol dimethacrylate, 1,6-hexanediol ethoxylate diacrylate, 10-undecenyl acrylate, 1H, 1H,2H,2H-perfluorodecyl acrylate, 1-naphthyl methacrylate, 1-pyrenemethyl methacrylate, 2-(2-bromoisobutyryloxy)ethyl methacrylate, 2-(4-benzoyl-3-hydroxyphenoxy)-ethyl acrylate, 2-(bromomethyl)acrylic acid, 2-(diethylamino)ethyl acrylate, 2-(diethylamino)ethyl methacrylate, 2-(diisopropylamino)ethyl methacrylate, 2-(dimethylamino)ethyl acrylate, 2-(dimethylamino)ethyl methacrylate, 2-(methacryloyloxy)ethyl [3-(triethoxysilyl)propyl]carbamate, 2-(methylthio)ethyl methacrylate, 2-(tert-butylamino)ethyl methacrylate, 2-(trifluoromethyl)acrylic acid, 2,2,2-trifluoroethyl methacrylate, 2,2,3,3,3-pentafluoropropyl acrylate, 2,2,3,3,3-pentafluoropropyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7-dodecafluoroheptyl acrylate, 2,2,3,3,4,4,5,5-octafluoropentyl acrylate, 2,2,3,3,4,4,5,5-octafluoropentyl methacrylate, 2,2,3,3-tetrafluoropropyl methacrylate, 2,2,3,4,4,4-hexafluorobutyl acrylate, 2,2,3,4,4,4-hexafluorobutyl methacrylate, 2-[(1',1',1'-trifluoro-2'-(trifluoromethyl)-2'-hydroxy)propyl]-3-norbornyl methacrylate, 2-[[(butylamino)carbonyl]oxy]ethyl acrylate, 2-[2-(3-prop-1-en-2-ylphenyl)propan-2-ylcarbamoyloxy]ethyl methacrylate, 2-[3-(2H-benzotriazol-2-yl)-4-hydroxyphenyl]ethyl methacrylate, 2-acrylamido-2-methyl-1-propanesulfonic acid, 2-acrylamido-2-methyl-1-propanesulfonic acid sodium salt, 2-aminoethyl methacrylate hydrochloride, 2-aminoethylmethacrylamide hydrochloride, 2-bromoacrylic acid, 2-carboxyethyl acrylate, 2-chloroethyl acrylate, 2-ethoxyethyl methacrylate, 2-ethylacrylic acid, 2-ethylacryloyl chloride, 2-ethylhexyl acrylate, 2-ethylhexyl methacrylate, 2-hydroxy-3-{3-[2,4,6,8-tetramethyl-4,6,8-tris-(propyl glycidyl ether)-2-cyclotetrasiloxanyl]propoxy}propyl methacrylate, 2-hydroxy-3-phenoxypropyl acrylate, 2-hydroxy-5-N-methacrylamidobenzoic acid, 2-hydroxyethyl acrylate, 2-hydroxyethyl methacrylate, 2-hydroxypropyl 2-(methacryloyloxy)ethyl phthalate, 2-hydroxypropyl methacrylamide, 2-isocyanatoethyl methacrylate, 2-methacryloyloxyethyl phosphoryl-choline, 2-N-morpholinoethyl methacrylate, 2-propylacrylic acid, 2-tetrahydropyranyl acrylate, 3-(acrylamido)phenylboronic acid, 3-(acryloyloxy)-2-hydroxypropyl methacrylate, 3-(dimethylamino)propyl acrylate, 3-(trichlorosilyl)propyl methacrylate, 3-(trimethoxysilyl) propyl acrylate, 3-(trimethoxysilyl)propyl methacrylate, 3-(trimethylsilyl)propargyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 3,3,4,4,5,5,6,6,7,7,8,8,9,9,10,10,10-heptadecafluorodecyl methacrylate, 3,3,4,4,5,5,6,6,7,7,8,8,9,9,10,10,11,11,12,12,12-heneicosafluorododecyl acrylate, 3,3,5-trimethylcyclohexyl methacrylate, 3,3'-diethoxypropyl methacrylate, 3,5,5-trimethylhexyl acrylate, 3-chloro-2-hydroxypropyl methacrylate, 3-O-acryloyl-1,2:5,6-bis-O-isopropylidene-D-glucofuranose, 3-sulfopropyl acrylate potassium salt, 3-sulfopropyl methacrylate potassium salt, 4-acetoxyphenethyl acrylate, 4-acryloylmorpholine, 4-hydroxybutyl acrylate, 4-methacryloxy-2-hydroxybenzophenone, 4-methacryloxyethyl trimellitic anhydride, 6-acetylthiohexyl methacrylate, acrylamide, acrylic acid, acrylic anhydride, acrylonitrile, acryloyl chloride, alkylacrylamide, allyl methacrylate, benzyl 2-propylacrylate, benzyl acrylate, benzyl methacrylate, bis(2-methacryloyl)oxyethyl disulphide, bis[2-(methacryl-oyloxy)ethyl] phosphate, bisphenol A glycerolate dimethacrylate, butyl acrylate, butyl methacrylate, cyclohexyl methacrylate, di(ethylene glycol) ethyl ether acrylate, di(ethylene glycol) methyl ether methacrylate, di(trimethylolpropane) tetraacrylate, diacetone acrylamide, diallyl phthalate, diethylene glycol butyl ether methacrylate, dipentaerythritol penta-/hexa-acrylate, diurethane dimethacrylate, ethyl 2-(bromomethyl)-acrylate, ethyl 2-(trimethylsilylmethyl)acrylate, ethyl 2-cyanoacrylate, ethyl 2-ethylacrylate, ethyl 2-propylacrylate, ethyl acrylate, ethyl cis-(β-cyano)acrylate, ethyl methacrylate, ethylene glycol dicyclopentenyl ether acrylate, ethylene glycol dicyclopentenyl ether methacrylate, ethylene glycol methyl ether acrylate, ethylene glycol methyl ether methacrylate, ethylene glycol phenyl ether acrylate, ethylene glycol phenyl ether methacrylate, fumaric acid, furfuryl methacrylate, glycerol 1,3-diglycerolate diacrylate, glycerol dimethacrylate, glycerol propoxylate triacrylate, glycidyl methacrylate, glycosyloxyethyl methacrylate, hexyl acrylate, hexyl methacrylate, hydroxybutyl methacrylate, hydroxypivalyl hydroxypivalate bis[6-(acryloyloxy)hexanoate], hydroxypropyl acrylate, hydroxypropyl methacrylate, isobornyl acrylate, isobornyl methacrylate, isobutyl acrylate, isobutyl methacrylate, isodecyl acrylate, isodecyl methacrylate, isooctyl acrylate, lauryl acrylate, lauryl methacrylate, methacrylamide, methacrylic acid, methacrylic acid N-hydroxysuccinimide ester, methacryloyl chloride, methyl 2-(bromomethyl)acrylate, methyl 2-(chloromethyl)acrylate, methyl 2-(trifluoromethyl)acrylate, methyl 2-acetamidoacrylate, methyl 3-hydroxy-2-methylenebutyrate, methyl a-bromoacrylate, methyl acrylate, methyl methacrylate, mono-2-(methacryloyloxy)ethyl maleate, mono-2-(methacryloyloxy)ethyl succinate, N-(3-aminopropyl)methacrylamide hydrochloride, N-(3-methoxypropyl)acrylamide, N-(hydroxymethyl)-acrylamide, N-(isobutoxymethyl)acrylamide, N-(triphenylmethyl)-methacrylamide, N,N'-(1,2-dihydroxyethylene)bisacrylamide, N,N-diethyl-acrylamide, N,N-diethylmethacrylamide, N,N-dimethylacrylamide, N,N'-ethylenebis(acrylamide), N,N'-hexamethylenebis (methacrylamide), N-[3-(dimethylamino)propyl]methacrylamide, N-[tris(hydroxymethyl)methyl]-acrylamide, N-acryloyl-L-valine, neopentyl glycol diacrylate, neopentyl glycol propoxylate diacrylate, N-ethylacrylamide, N-hydroxyethyl acrylamide, N-isopropylacrylamide, N-isopropylmethacrylamide, N-phenylacrylamide, N-propylacrylamide, N-tert-butylacrylamide, octadecyl acrylate, pentabromobenzyl acrylate, pentabromophenyl acrylate, pentabromophenyl methacrylate, pentaerythritol tetraacrylate, pentaerythritol triacrylate, pentafluorophenyl acrylate, pentafluorophenyl methacrylate, phenyl methacrylate, phosphoric acid 2-hydroxyethyl methacrylate, poly(ethylene glycol) 2,4,6-tris(1-phenylethyl)phenyl ether methacrylate, poly(ethylene glycol) behenyl ether methacrylate, poly(ethylene glycol) diacrylate, poly(ethylene glycol) methyl ether acrylate, poly (propylene glycol) acrylate, poly(propylene glycol) diacrylate, poly(propylene glycol) dimethacrylate, poly(propylene glycol) methacrylate, propyl methacrylate, pyridyl disulfide ethyl methacrylate, pyromellitic dianhydrate dimethacrylate, pyromellitic dianhydride glycerol dimethacrylate, sodium acrylate, sodium methacrylate, solketal methacrylate, stearyl acrylate, stearyl methacrylate, styrene, TEMPO methacrylate, tert-butyl 2-bromoacrylate, tert-butyl acrylate, tert-butyl methacrylate, tetrahydrofurfuryl acrylate, tetrahydrofurfuryl methacrylate, tricyclo[5.2.1.02,6]decanedimethanol diacrylate, triethylene glycol methyl ether methacrylate, triethyleneglycol dimethacrylate, trimethylolpropane ethoxylate methyl ether diacrylate, trimethylolpropane ethoxylate triacrylate, trimethylolpropane propoxylate triacrylate, trimethylol-propanetriacrylate, vinyl acetate, vinyl acrylate, vinyl methacrylate, vinyl neodecanoate. Preferred polyacrylates comprise at least one monomer of the group of acrylic acid, fumaric acid, methacrylic acid, 2-ethylacrylic acid, 2-hydroxy-5-N-methacrylamidobenzoic acid and 2-propylacrylic acid as monomeric source for the carboxylic groups of the polyacrylate polymer.

Preferred ratios between the polysiloxane and the total of polymer dispersions are between 25 and 400 parts of polysiloxane to 100 parts of the total of polymer dispersions, wherein the parts of both polysiloxane and the parts of the total of polymer dispersions are referring to the mass of the non-volatile components therein. More preferably, the ratio between the polysiloxane and the total of polymer dispersions are between 50 and 200 parts of polysiloxane to 100 parts of the total of polymer dispersions, wherein the parts of both polysiloxane and the parts of the total of polymer dispersions are referring to the mass of the non-volatile components therein.

The composition of the present invention contains both volatile and non-volatile components. The polysiloxanes themselves are non-volatile components, but solutions or dispersions of polysiloxanes may also be used. The at least one dispersion of a polymer or copolymer comprises the polymer or copolymer as non-volatile components and water and solvents as volatile components. The composition of the present invention contains preferably an amount of non-volatile components of at least 10%, most preferably at least 20%.

Suitable emulsifiers are in principle all surface-active compounds having a nonionic, anionic, cationic or amphoteric character which are suitable for emulsification of the polysiloxanes and polymers and have as little an adverse effect as possible on the imparting of water repellency. Dimethyldodecylamine N-oxide, dimethyltetradecylamine N-oxide and N—(C8-C30)-acylamino acids, such as N-oleylsarcosine, N-laurylsarcocine, N-stearylsarcosine, N-oleylaspartic acid, N-hexadecylaspartic acid, N-stearylaspartic acid or the corresponding derivatives of glutamic acid, fatty acids, such as for example oleic acid, lauric acid, tallow fatty alcoholates and their ethoxylation products and the sulphuric acid monoesters of the fatty alcohols and of the ethoxylation products of the fatty alcohols are particularly suitable. The acids are present in general in the form of the alkali metal, ammonium, trialkylammonium, or mono-, di- or trialkanolammonium salts, or morpholinium salts or other amino salts, such as 2-amino-2-methylpropanol salts or an aminocarboxylic acid, for example sarcosine. Usually, the compositions of the present invention contain 0.0 to 30% by weight, in particular 0.5 to 20% by weight, preferably 1.0 to 5% by weight, of emulsifiers or mixtures of said emulsifiers such as from the above-mentioned group. The presence of emulsifiers is optional; the same good waterproofing results are obtained in the absence of emulsifiers.

To neutralize carboxyl groups present, the polysiloxanes are advantageously standardized in aqueous solution with the corresponding amount of alkali (for example sodium hydroxide or potassium hydroxide), ammonia, a saturated organic amine, alkanolamine or an aminocarboxylic acid to a pH of from 7 to 10, preferably from 7.5 to 8.5. Suitable salts are alkali metal salts, in particular of sodium or potassium, ammonium salts, or amine salts, in particular those of morpholine and alkanolamine salts in particular those of mono-, di- or trialkanolamines, such as mono-, di- or triethanolamine. It is also possible to neutralize the carboxyl groups with aminocarboxylic acids, for example sarcosine.

The composition of the present invention comprises components that are non-volatile as well as components that are partly or fully volatile. The partly volatile components are, for example, aqueous polymer dispersions or plasticizers and fully volatile components are, for example, water and organic solvents that are miscible with water. Volatile is meant to be the components that evaporate from a composition when a small amount of the composition is dried in an oven at elevated temperature, such as 105° C. or 150° C. The composition of the present invention has preferably a non-volatile content of at least 10 weight %, more preferably a non-volatile content of at least 20 weight %, most preferably at least 30 weight %.

If optionally one or more organic solvents is present in the composition of the present invention then preferably the organic solvent is a water-miscible organic solvent preferably selected from the group consisting of monohydric alcohols, polyhydric alcohols, ethers and ethers of polyhydric alcohols, ketones, esters of organic acids and aromatic solvents. Preferably, the ester of organic acids is selected from the group consisting of ethyllactate, dimethyl carbonate, propylene carbonate. Preferably, the polyhydric alcohol is selected from the group consisting of ethylene glycol monoethyl ether, ethylene glycol monobutyl ether, diethylene glycol monomethyl ether, diethylene glycol monoethyl ether, diethylene glycol monobutyl ether, dipropylene glycol dimethyl ether, butyltriglycol and 1-methoxy-2-propanol. More preferably, the water-miscible organic solvent is selected from the group consisting of ethanol, isopropyl alcohol, n-butanol, benzyl alcohol, butyltriglycol, acetone, ethyl methyl ketone, butyl acetate, diethylene glycol monobutyl ether, dipropylene glycol dimethyl ether and 1-methoxy-2-propanol, or mixtures thereof. The amount of the organic solvent can be between 0 and 90%, preferably between 5 and 80% by weight of the total composition.

If optionally one or more plasticizers is added then preferably, the plasticizer is selected from the group of phtalic acid alkylesters, mono-acid alkylesters, di-acid alkylesters, tri-acid alkylesters, polyesters, phosphate esters, polyethers, polyether-polyesters, glycols, fatty acid esters, normal or modified natural or mineral oils, sulphonated oils, ethoxylated oils, epoxidized oils, fatty acids, sulfonamides, fat liquors, lecithine or mixtures thereof. Most preferred, the plasticizer is selected from the group consisting of acetyltributylcitrate, acetyltrioctylcitrate, tributylcitrate, tributylphosphate, triisopropylphosphate, dioctyladipate, diisobutylmaleate, triethylene glycol dihexanoate. Also a combination of one or more water-miscible organic solvents and one or more plasticizers may be used. The amount of the plasticizer can be between 0 and 35%, preferably between 2 and 20% by weight of the total composition.

If desired, defoamers, flame retardants, thickeners, stabilizers, wetting agents, biocides, anti-oxidants and/or anti-settling agents may be included in the composition of the present invention.

The composition of the present invention can be prepared by mixing the components using moderate to high shear and then if desired diluting with more water and adjusting the pH with acids or bases. Preparation of the composition of the present invention can be done at ambient temperature, but modest heating to 30-60° C. is preferred. Common biocides can optionally be added as storage preservatives. Preferably, the mixture is pumped via a homogenizer in order to achieve a homogeneous mixture. Such homogenizer is operated at elevated pressure, for example at 50 bar or up to 250 bar. The mixture may also be pumped through such homogenizer for more than one time, for example two times or four times.

In a second aspect, the present invention relates to the use of the present composition for waterproofing treatment of leather, pelts, skins, hides, leather intermediate products or non-finished leather generally in an amount of between 3% and 25%, preferably between 5% and 20%, wherein the percentages are the weight percentages of the composition based on the shaved weight of the tanned material (wet blue).

The compositions of the present invention can be used to prepare leathers for all applications, for example shoe, furniture, car, clothing and bag leathers.

Any kind of leather which is conventionally treated is suitable to be treated by using a composition of the present invention, particularly grain leather (e.g. nappa from sheep, goat or cow and box-leather from calf or cow), suede leather (e.g. velours from sheep, goat or calf and hunting leather), split velours (e.g. from cow or calf skin), buckskin and nubuck leather; further also woollen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned, synthetic organic reactive tanning or semi-chrome tanned). If desired, the leather may also be retanned; for re-tanning there may be used any tanning agent conventionally employed for re-tanning, e.g. mineral, vegetable or synthetic tanning agents [e.g. chromium, zirconyl or aluminium derivatives, quebracho, chestnut or mimosa extracts, aromatic syntans, polyurethanes, (co)polymers of (meth)acrylic acid compounds or melamine/dicyanodiamide and/or urea/formaldehyde resins].

The leathers can be of various thicknesses, such as from 0.5 mm to 8 mm, thus, thin leathers, are suitable for garment leather or glove-leather (nappa); leather of medium thickness, is suitable for shoe upper leather, and handbags, or also thick leathers, are for shoe-sole leather, furniture leather, leather for suitcases, for belts and for sport articles; hair-bearing leathers and furs may also be used.

During the leather treatment with the composition of the present invention, conventional leather dyes can optionally be added to the liquor. Suitable examples are acidic, substantive or basic aniline dyes, which can be used in amounts customary in tanning.

During the leather treatment with the composition of the present invention, organic solvents, for example alcohols, can optionally be added separately from the composition. However, the procedure is preferably carried out without addition of organic solvents.

The leather treated according to the process of the invention is notable for a good water resistance according to ISO DIN EN ISO 5403-2 and DIN EN ISO 5403-1, while other properties of the leather, such as suppleness, tear strength, touch and feel aspects, remain good and are not deteriorated by the process of the invention.

The present invention will be further elaborated by the following non-limiting working examples. Parts and percentages of components referred to in these working examples are drawn to the weight of the total composition wherein these components are present, like in the other parts of the description and claims, unless otherwise indicated.

Example 1 Waterproofing Composition

An amount of 274.0 kg of SLM46038 (a polydimethylsiloxane with carboxyl side group, with 100% being non-volatile, obtained from Wacker Chemie AG) and 4.0 kg of oleic acid were added consecutively into a reactor, equipped with a stirrer, followed by stirring for 15 minutes at ambient temperature. An amount of 1010.0 kg of Acrilem WP 937 (an aqueous polyacrylate dispersion, which has a COOH content of approximately 2 weight %, with a non-volatile component of 38.8%, sold as an enhancing agent for leather industry, obtainable from ICAP SIRA spa) was added slowly, during 30 minutes, to the mixture, after which the mixture was heated to 50° C. and mixed for 60 minutes. An amount of 735,5.0 kg of demineralized water was slowly, during 30 minutes, added to the mixture and stirring was continued for another 60 minutes at 50° C. Next, an amount of 40.0 kg of morpholine was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 4.0 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 27 to 100 parts, when comparing weight by weight. The ratio polydimethylsiloxane to the polymer inside the dispersion was 70 to 100 parts comparing weight of non-volatile components in the polydimethylsiloxane and the polymer dispersion.

Example 2 Waterproofing Composition

An amount of 1500.0 kg of a polyacrylate dispersion with a non-volatile content of 40%, made according to Example I.1 of EP 2190892, which has a COOH content of 13 weight %, was added into a reactor, equipped with a stirrer, followed by stirring for 15 minutes at ambient temperature. An amount of 438.4 kg of SLM46038 (a polydimethylsiloxane with carboxyl side group, with 100% being non-volatile, obtained from Wacker Chemie AG) and 6.4 kg of oleic acid were added consecutively into the reactor, slowly, during 30 minutes, after which the mixture was heated to 50° C. and mixed for 60 minutes. An amount of 1244 kg of demineralized water was slowly, during 30 minutes, added to the mixture and stirring was continued for another 60 minutes at 50° C. Next, an amount of 64 kg of 2-amino-2-methylpropanol was added slowly to the mixture, while keeping the temperature of the mixture below 60° C., for which some cooling was needed and stirring was continued for another 45 minutes at 50° C. As last addition, an amount of 6.4 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 29 to 100 parts by weight. The ratio polydimethylsiloxane to the polymer inside the dispersion was 73 to 100 parts comparing weight of non-volatile components in the polydimethylsiloxane and the polymer dispersion.

Example 3 Waterproofing Composition

An amount of 548 kg of SLM441109 (a polydimethylsiloxane with glycidoxy side group, with 100% being non-volatile, obtainable from Wacker Chemie AG) and 8.0 kg of oleic acid were added consecutively into a reactor, equipped with a stirrer, followed by stirring for 15 minutes at ambient temperature. An amount of 1800 kg of a polyacrylate dispersion with a non-volatile content of 40%, made according to Example I.1 of EP 2190892, which has a COOH content of 13 weight %, was added slowly, during 30 minutes, to the mixture, after which the mixture was heated to 50° C. and mixed for 60 minutes. An amount of 1516 kg of demineralized water was slowly, during 30 minutes, added to the mixture and stirring was continued for another 60 minutes at 50° C. Next, an amount of 80 kg of morpholine was added slowly to the mixture, while keeping the temperature of the mixture below 60° C., for which some cooling was needed and stirring was continued for another 45 minutes at 50° C. As last addition, an amount of 8 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 30 to 100 parts by weight. The ratio polydimethylsiloxane to the polymer inside the dispersion was 76 to 100 parts comparing weight of non-volatile components in the polydimethylsiloxane and the polymer dispersion.

Example 4 Waterproofing Composition

An amount of 13.7 kg of SLM46038 (a polydimethylsiloxane with carboxyl side group, with 100% being non-volatile, obtained from Wacker Chemie AG) and 0.2 kg of oleic acid were added consecutively into a reactor, equipped with a stirrer, followed by stirring for 15 minutes at ambient temperature. An amount of 45.9 kg of a polyacrylate dispersion with a non-volatile content of 40%, made according to Example I.1 of EP 2190892, which has a COOH content of 13 weight %, was added slowly, during 30 minutes, to the mixture, after which the mixture was heated to 50° C. and mixed for 60 minutes. An amount of 37.9 kg of demineralized water was slowly, during 30 minutes, added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 30 to 100 parts by weight. The ratio polydimethylsiloxane to the polymer inside the dispersion was 75 to 100 parts comparing weight of non-volatile components in the polydimethylsiloxane and the polymer dispersion.

Example 5 Waterproofing Composition

An amount of 219.2 kg of SLM441109 (a polydimethylsiloxane with glycidoxy side group, with 100% being non-volatile, obtainable from Wacker Chemie AG) and 3.2 kg of oleic acid were added consecutively into a reactor, equipped with a stirrer, followed by stirring for 15 minutes at ambient temperature. An amount of 720 kg of a polyacrylate dispersion with a non-volatile content of 40%, made according to Example I.1 of EP 2190892, which has a COOH content of 13 weight %, was added slowly, during 30 minutes, to the mixture, after which the mixture was heated to 50° C. and mixed for 60 minutes. An amount of 606 kg of demineralized water was slowly, during 30 minutes, added to the mixture and stirring was continued for another 60 minutes at 50° C. Next, an amount of 32.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 2.0 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 30 to 100 parts by weight. The ratio polydimethylsiloxane to the polymer inside the dispersion was 76 to 100 parts comparing weight of non-volatile components in the polydimethylsiloxane and the polymer dispersion.

Example 6 Waterproofing Composition

An amount of 13.7 kg of SLM46038 (a polydimethylsiloxane with carboxyl side group, with 100% being non-volatile, obtained from Wacker Chemie AG) and 0.2 kg of oleic acid were added consecutively into a reactor, equipped with a stirrer, followed by stirring for 15 minutes at ambient temperature. An amount of 42.3 kg of a polyacrylate dispersion with a non-volatile content of 43%, made according to Example I.2 of EP 2190892, which has a COOH content of 8 weight %, was added slowly, during 30 minutes, to the mixture, after which the mixture was heated to 50° C. and mixed for 60 minutes. An amount of 37.9 kg of demineralized water was slowly, during 30 minutes, added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 32 to 100 parts by weight. The ratio polydimethylsiloxane to the polymer inside the dispersion was 75 to 100 parts comparing weight of non-volatile components in the polydimethylsiloxane and the polymer dispersion.

Example 7 Waterproofing Composition

An amount of 219.2 kg of SLM 441109 (a polydimethylsiloxane with glycidoxy side group, with 100% being non-volatile, obtainable from Wacker Chemie AG) and 3.2 kg of oleic acid were added consecutively into a reactor, equipped with a stirrer, followed by stirring for 15 minutes at ambient temperature. An amount of 663 kg of a polyacrylate dispersion with a non-volatile content of 43%, made according to Example I.2 of EP 2190892, which has a COOH content of 8 weight %, was added slowly, during 30 minutes, to the mixture, after which the mixture was heated to 50° C. and mixed for 60 minutes. An amount of 606 kg of demineralized water was slowly, during 30 minutes, added to the mixture and stirring was continued for another 60 minutes at 50° C. Next, an amount of 32.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 2.0 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 33 to 100 parts by weight. The ratio polydimethylsiloxane to the polymer inside the dispersion was 77 to 100 parts comparing weight of non-volatile components in the polydimethylsiloxane and the polymer dispersion.

Example 8 Waterproofing Composition

An amount of 1500.0 kg of a polyacrylate dispersion with a non-volatile content of 41%, made according to Example I.3 of EP 2190892, which has a COOH content of 13 weight %, was added into a reactor, equipped with a stirrer, followed by stirring for 15 minutes at ambient temperature. An amount of 438.4 kg of SLM46038 (a polydimethylsiloxane with carboxyl side group, with 100% being non-volatile, obtained from Wacker Chemie AG) and 6.4 kg of oleic acid were added consecutively into the reactor, slowly, during 30 minutes, after which the mixture was heated to 50° C. and mixed for 60 minutes. An amount of 1244 kg of demineralized water was slowly, during 30 minutes, added to the mixture and stirring was continued for another 60 minutes at 50° C. Next, an amount of 64 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 6.4 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 29 to 100 parts by weight. The ratio polydimethylsiloxane to the polymer inside the dispersion was 71 to 100 parts comparing weight of non-volatile components in the polydimethylsiloxane and the polymer dispersion.

Example 9 Waterproofing Composition

An amount of 1500.0 kg of a polyacrylate dispersion with a non-volatile content of 41%, made according to Example I.3 of EP 2190892, which has a COOH content of 13 weight %, was added into a reactor, equipped with a stirrer, followed by stirring for 15 minutes at ambient temperature. An amount of 438.4 kg of SLM 441109 (a polydimethylsiloxane with glycidoxy side group, with 100% being non-volatile, obtainable from Wacker Chemie AG) and 6.4 kg of oleic acid were added consecutively into the reactor, slowly, during 30 minutes, after which the mixture was heated to 50° C. and mixed for 60 minutes. An amount of 1244 kg of demineralized water was slowly, during 30 minutes, added to the mixture and stirring was continued for another 60 minutes at 50° C. Next, an amount of 64 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 6.4 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 29 to 100 parts by weight. The ratio polydimethylsiloxane to the polymer inside the dispersion was 71 to 100 parts comparing weight of non-volatile components in the polydimethylsiloxane and the polymer dispersion.

Example 10 Waterproofing Composition

An amount of 1398.0 kg of a polyacrylate dispersion with a non-volatile content of 43%, made according to Example I.5 of EP 2190892, which has a COOH content of 11 weight %, was added into a reactor, equipped with a stirrer, followed by stirring for 15 minutes at ambient temperature. An amount of 438.4 kg of SLM46038 (a polydimethylsiloxane with carboxyl side group, with 100% being non-volatile, obtained from Wacker Chemie AG) and 6.4 kg of oleic acid were added consecutively into the reactor, slowly, during 30 minutes, after which the mixture was heated to 50° C. and mixed for 60 minutes. An amount of 1244 kg of demineralized water was slowly, during 30 minutes, added to the mixture and stirring was continued for another 60 minutes at 50° C. Next, an amount of 64 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 6.4 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 31 to 100 parts by weight. The ratio polydimethylsiloxane to the polymer inside the dispersion was 73 to 100 parts comparing weight of non-volatile components in the polydimethylsiloxane and the polymer dispersion.

Example 11 Waterproofing Composition
(Comparative)

An amount of 13.7 kg of SLM 441109 (a polydimethylsiloxane with glycidoxy side group, with 100% being non-volatile, obtainable from Wacker Chemie AG) and 0.2 kg of oleic acid were added consecutively into a reactor, equipped with a stirrer, followed by stirring for 15 minutes at ambient temperature. An amount of 45.9 kg of Mowilith DM 105 (a polyacrylate dispersion with a non-volatile content of 55%, which has a COOH content of 0 weight %, obtainable from Celanese Corporation) was added slowly, during 30 minutes, to the mixture, after which the mixture was heated to 50° C. and mixed for 60 minutes. An amount of 37.9 kg of demineralized water was slowly, during 30 minutes, added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 30 to 100 parts by weight. The ratio polydimethylsiloxane to the polymer inside the dispersion was 54 to 100 parts comparing weight of non-volatile components in the polydimethylsiloxane and the polymer dispersion.

Example 12 Waterproofing Composition
(Comparative)

An amount of 13.7 kg of SLM46038 (a polydimethylsiloxane with carboxyl side group, with 100% being non-volatile, obtained from Wacker Chemie AG) and 0.2 kg of oleic acid were added consecutively into a reactor, equipped with a stirrer, followed by stirring for 15 minutes at ambient temperature. An amount of 45.9 kg of Mowilith DM 105 (a polyacrylate dispersion with a non-volatile content of 55%, which has a COOH content of 0 weight %, obtainable from Celanese Corporation) was added slowly, during 30 minutes, to the mixture, after which the mixture was heated to 50° C. and mixed for 60 minutes. An amount of 37.9 kg of demineralized water was slowly, during 30 minutes, added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 30 to 100 parts by weight. The ratio polydimethylsiloxane to the polymer inside the dispersion was 54 to 100 parts comparing weight of non-volatile components in the polydimethylsiloxane and the polymer dispersion.

Example 13 Waterproofing Composition (Comparative)

An amount of 13.7 kg of SLM 441109 (a polydimethylsiloxane with glycidoxy side group, with 100% being non-volatile, obtainable from Wacker Chemie AG)) and 0.2 kg of oleic acid were added consecutively into a reactor, equipped with a stirrer, followed by stirring for 15 minutes at ambient temperature. An amount of 81.5 kg of Tergotan H2 (a polyacrylate dispersion, which has a COOH content of 43 weight %, with a non-volatile content of 24%, obtainable from Stahl Europe B.V.) was added slowly, during 30 minutes, to the mixture, after which the mixture was heated to 50° C. and mixed for 60 minutes. An amount of 2.4 kg of demineralized water was slowly added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 17 to 100 parts by weight. The ratio polydimethylsiloxane to the polymer inside the dispersion was 70 to 100 parts comparing weight of non-volatile components in the polydimethylsiloxane and the polymer dispersion.

Example 14 Waterproofing Composition (Comparative)

An amount of 13.7 kg of SLM46038 (a polydimethylsiloxane with carboxyl side group, with 100% being non-volatile, obtained from Wacker Chemie AG) and 0.2 kg of oleic acid were added consecutively into a reactor, equipped with a stirrer, followed by stirring for 15 minutes at ambient temperature. An amount of 81.5 kg of Tergotan H2 (a polyacrylate dispersion, which has a COOH content of 43 weight %, with a non-volatile content of 24%, obtainable from Stahl Europe B.V.) was added slowly, during 30 minutes, to the mixture, after which the mixture was heated to 50° C. and mixed for 60 minutes. An amount of 2.4 kg of demineralized water was slowly added to the mixture and stirring was continued for another 60 minutes at 50° C. Next, an amount of 2.0 kg of 2-amino-2-methylpropanol was added slowly to the mixture, while keeping the temperature of the mixture below 60° C., for which some cooling was needed and stirring was continued for another 45 minutes at 50° C. Next, the contents of the reactor was pumped via a homogenizer, operated at 250 bar, to another reactor, followed by again pumping via a homogenizer, operated at 250 bar, to another reactor. As last addition, an amount of 0.2 kg of Acticide B20 (a biocide, obtainable from Thor) was added to the mixture. The result is a white dispersion with a non-volatile content of 35.5% (when dried at 140° C.). The ratio polydimethylsiloxane to polymer dispersion was 17 to 100 parts by weight. The ratio polydimethylsiloxane to the polymer inside the dispersion was 70 to 100 parts comparing weight of non-volatile components in the polydimethylsiloxane and the polymer dispersion.

Example 15 Treating Leather with Waterproofing Mixtures

Leather pieces were treated in a drum with the waterproofing mixtures from Example 1 to 14. Full grain leather and nubuck leather was used. The percentages are the weight percentages based on the shaved weight of the tanned material (wet blue).

In first step, the washing step, 200% of water of 40° C. was added and the drum was ran for 30 minutes, followed by draining the liquid. In the next step, the neutralization step, 100% of water of 30° C. and 2% of sodium formate were added, and after running for 30 minutes, 1.2% of sodium bicarbonate was added, after which the drum was ran for 120 minutes, and a pH of between 6.0 and 6.2 was reached, followed by draining the liquid. Another washing step with 200% of water of 30° C. was done, followed by draining the liquid.

In the next step, the retanning step, 75% of water of 30° C. and 3% of Tergotan PR (retanning agent, obtainable from Stahl Europe B.V.) were added and the drum was ran for 30 minutes. Next, 3% of Mimosa ME (a tanning agent from *Acacia mearnsii* extract, obtainable from Mimosa Extract Company (Pty) Ltd) and 4% of Relugan DLF (a retanning resin, obtainable from Stahl Europe B.V.) were added, followed by running for 45 minutes. The leather was subsequently dyed by adding 3% of Melioderm Brown G (a powder dye obtainable from Stahl Europe B.V.), and running for another 45 minutes.

10% of the waterproofing agents from the Examples 1 to 14, or from the industry reference products Chemtan S-52 and Truposist G, was added and the drum was ran for 120 minutes. Truposist G is a hydrophobing agent containing silicone polymers from Trumpler GmbH. Chemtan S-52 is a water resistant retanning fatliquor containing silicone polymers, from Chemtan Co Inc.

Next, 150% of water of 60° C. was added, and the drum was ran for 30 minutes, followed by the addition of 1.25% of formic acid, followed by running the drum for 20 minutes, followed by another addition of 1.25% of formic acid and running the drum for another 20 minutes, followed by yet another addition of 1.25% of formic acid and running the drum for another 60 minutes. Subsequently, the liquid was drained and the contents of the drum was washed twice with 300% of water of 30° C., followed by draining the liquid.

Example 16 Evaluation of Treated Leather Pieces

The leather pieces from Example 15 were evaluated, according to Maeser, Bally Penetrometer and static water uptake. The results are listed in Table 1.

The Maeser tests were done according to DIN EN ISO 5403-2, which specifies a method for determining the dynamic water resistance of leather by means of repeated angular compression. It is applicable to all flexible leathers but is particularly suitable for leathers intended for footwear applications. A square test specimen is folded and secured in two V-shaped clamps, which have closed ends so as to form a trough. The trough is then immersed in water and the clamp at one end oscillates at a constant speed so that the specimen is repeatedly flexed. The test is stopped at the first sign of water penetration through the test specimen. The penetration of water is expressed as the number of cycles after which the water penetration is noted visually or electronically.

The Bally Penetrometer tests were done according to DIN EN ISO 5403-1, which specifies a method for determination of water resistance of flexible leather by means of repeated linear compression. It is applicable to all flexible leathers but is particularly suitable for leathers intended for footwear applications. A test piece is formed into the shape of a trough and flexed while partially immersed in water. The time taken for water to penetrate through the test piece is measured. The method also allows for the percentage mass of the water absorbed and the mass of the water transmitted through the test piece to be determined.

TABLE 1 results from waterproofing tests

| Water-proofing composition | Leather | Maeser Number of cycles | Maeser-duplo Number of cycles | Bally Penetrometer minutes | Bally Penetrometer Water uptake |
|---|---|---|---|---|---|
| 1 | Full Grain | 17500 | 16000 | 360 | 24.7% |
| 2 | Full Grain | 40000 | 40000 | >480 | 16.4% |
| 3 | Full Grain | 38000 | 38000 | >480 | 14.6% |
| 4 | Full Grain | 40000 | 40000 | >480 | 9.2% |
| 5 | Full Grain | 40000 | 40000 | >480 | 9.6% |
| 6 | Full Grain | 37000 | 37000 | >480 | 12.2% |
| 7 | Full Grain | 37000 | 37000 | >480 | 13.2% |
| 8 | Full Grain | 37000 | 37000 | >480 | 9.9% |
| 9 | Full Grain | 37000 | 37000 | >480 | 10.2% |
| 10 | Full Grain | 40000 | 40000 | >480 | 10.2% |
| 11 (comp) | Full Grain | 1900 | 1500 | 330 | 30.7% |
| 12 (comp) | Full Grain | 600 | 500 | 116 | 26.4% |
| 13 (comp) | Full Grain | 600 | 1500 | 350 | 10.5% |
| 14 (comp) | Full Grain | 600 | 1100 | 123 | 14.6% |
| CHEMTAN S-52 | Full Grain | 830 | 830 | 108 | 8.9% |
| TRUPOSIST G | Full Grain | 3800 | 3800 | 300 | 12.2% |
| 2 | Nubuck | 40000 | 40000 | >480 | 13.7% |
| 3 | Nubuck | 40000 | 40000 | >480 | 14.9% |
| 4 | Nubuck | 40000 | 40000 | >480 | 14.4% |
| 5 | Nubuck | 40000 | 37000 | >480 | 14.0% |
| 6 | Nubuck | 37000 | 37000 | >480 | 14.3% |
| 7 | Nubuck | 40000 | 37000 | >480 | 13.9% |
| 8 | Nubuck | 37000 | 40000 | >480 | 14.6% |
| 9 | Nubuck | 37000 | 37000 | >480 | 13.2% |
| 10 | Nubuck | 40000 | 40000 | >480 | 14.0% |
| 11 (comp) | Nubuck | 4500 | 4200 | >480 | 16.6% |
| 12 (comp) | Nubuck | 1600 | 1060 | 40 | 35.8% |
| 13 (comp) | Nubuck | 1600 | 1300 | >480 | 16.6% |
| 14 (comp) | Nubuck | 1300 | 1060 | 40 | 14.8% |
| CHEMTAN S-52 | Nubuck | 4500 | 4500 | 370 | 13.3% |
| TRUPOSIST G | Nubuck | 7000 | 7000 | >480 | 13.0% |

The Maeser results obtained for leather treated with waterproofing compositions from Example 1 to 10 were notably better, for both full grain and nubuck leather, than obtained with leather treated with industry reference products Chemtan S-52, Truposist G and compositions from Comparative Examples 11 to 14.

Also the Bally penetrometer results obtained for leather treated with waterproofing compositions from Example 1 to 10 were notably better for all full grain leathers and most of the nubuck leathers, than obtained with leather treated with industry reference products Chemtan S-52, Truposist G and compositions from Comparative Examples 11 to 14.

Example 17 with and without Oleic Acid

Two waterproofing compositions were prepared, similar as the waterproofing composition of Example 2, but a solution of 36 kg of sodium hydroxide in 84 kg of water was added instead of 64 kg of 2-amino-2-methylpropanol. No oleic acid was added in one of the two compositions.

Pieces of full grain leather were treated with both waterproofing compositions, according to the method described in Example 15. The obtained pieces of leather were evaluated, according to the methods described in Example 16.

The leather treated with the waterproofing composition that included oleic acid survived 25.000 Maeser cycles, more than 480 minutes of Bally Penetrometer flexes and showed a Bally Penetrometer static water uptake of 30%.

The leather treated with the waterproofing composition that did not include oleic acid survived 25.000 Maeser cycles, more than 480 minutes of Bally Penetrometer flexes and showed a Bally Penetrometer static water uptake of 33%.

The results are very similar and thus demonstrate that the presence of oleic acid is not essential to obtain these results.

The invention claimed is:

1. A composition for treatment of leather comprising
   (A) a polydiorganosiloxane that may have some degree of branching and which has carboxylic side groups and/or epoxide side groups;
   (B) at least one polymer dispersion that contains 2 to 35 weight % of carboxylic groups;
   (C) optionally one or more emulsifiers;
   (D) optionally one or more plasticizers or organic solvents; and
   (E) optionally water;
   wherein the polydiorganosiloxane has units of the general formula (I)

$$R^1_a R^2_b Q_c SiO_{((4-a-b-c)/2)} \quad (I)$$

wherein the substituents $R^1$ are hydrogen atoms or identical or different $C_1$- to $C_{18}$-hydrocarbon radicals which are optionally substituted by fluorine, chlorine or bromine atoms or cyano groups and are optionally interrupted by the groups —O— or —S— or additional polyoxyalkylene groups, $R^2$ are $C_1$- to $C_{12}$-alkoxy radicals or hydroxyl radicals, and the substituents Q are identical or different monovalent groups of the formula (II)

$$-CR^3_2-CHR^3-R^4-Z \quad (II)$$

wherein Z is a carboxyl group or an epoxide group;
   wherein the substituents $R^3$ are hydrogen atoms or identical or different monovalent $C_1$- to $C_{10}$-hydrocarbon radicals which are optionally substituted by fluorine, chlorine or bromine atoms;
   wherein the substituent $R^4$ is a divalent $C_1$- to $C_{18}$-hydrocarbon radical which is optionally substituted by fluorine, chlorine or bromine atoms or cyano groups and optionally interrupted by the groups —O— or —S— or additional polyoxyalkylene groups;
   wherein a has the values 0, 1, 2 or 3 and b has the values 0, 1, 2 or 3 and c has the values 0, 1, 2 or 3 and the sum of a+b+c is not more than 3;
   with the proviso that, if Z represents a carboxy group, at least 0.1 mol % of units according to formula (I) are present in the polydiorganosiloxane, and a has the value 0 or 1, b has the value 0, 1, 2 or 3, c has the value 0 or 1, and $R^1$, $R^2$, $R^3$ are as above defined and the sum of a+b+c is not more than 3 and the sum of a+c is not more than 1.

2. Composition according to claim 1, wherein the component (A) is a branched organofunctional polydiorganosiloxane of the general formula

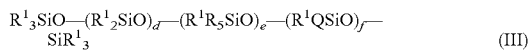

(III)

wherein $R^1$ and Q have the same meaning as above and $R^5$ has the same meaning as $R^2$ or is a group of the general formula

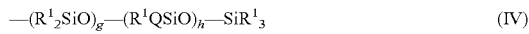

(IV)

wherein $R^1$ and Q have the same meaning as above, wherein d has integer values from 50 to 500, e has integer values of 1 to 10, f has integer values from 1 to 20, g has integer values from 50 to 500 and h has integer values from 1 to 20, with the proviso that, if Z represents a carboxyl group, at least one radical $R^5$ is represented by a group of formula (IV).

3. Composition according to claim 1, wherein the polydiorganosiloxane has a content of below 0.1 weight % of so-called D4 (octamethylcyclotetrasiloxane), D5 (decamethylcyclopentasiloxane) and D6 (dodecamethylcyclohexasiloxane).

4. Composition according to claim 1, wherein the ratio between the polydiorganosiloxane and the total of polymer dispersions is between 25 and 400 parts of polydiorganosiloxane to 100 parts of the total of polymer dispersions, wherein the parts of both polydiorganosiloxane and the parts of the total of polymer dispersions are referring to the mass of the non-volatile components therein.

5. Composition according to claim 1, wherein the molecular weight of the polydiorganosiloxane is between 5,000 and 250,000 Daltons.

6. Composition according to claim 1 wherein the amount of carboxylic groups present in the polydiorganosiloxanes is such that the acid value, as measured according to DIN 53402, is between 2 and 50 mg KOH/g.

7. Composition according to claim 1, wherein the amount of epoxide groups present in the polydiorganosiloxanes is such that the epoxide equivalent weight is between 1000 and 10,000.

8. Composition according to claim 1, wherein the at least one polymer dispersion is a polyacrylate dispersion, a polyolefin dispersion or a polyurethane dispersion, or a combination thereof.

9. Composition according to claim 8, wherein—the at least one polymer dispersion is an aqueous polyacrylate dispersion.

10. Composition according to claim 1, wherein the composition is liquid at ambient conditions.

11. Composition according to claim 1, wherein the composition has a non-volatile content of at least 10%.

12. Composition according to claim 1, wherein the at least one polymer dispersion contains 5 to 25 weight % of carboxylic groups.

13. Composition according to claim 5, wherein the molecular weight of the polydiorganosiloxane is between 10,000 and 200,000 Daltons.

14. Composition according to claim 6, wherein the amount of carboxylic groups present in the polydiorganosiloxanes is such that the acid value, as measured according to DIN 53402, is between 5 and 35 mg KOH/g.

15. Composition according to claim 7, wherein the amount of epoxide groups present in the polydiorganosiloxanes is such that the epoxide equivalent weight is between 2000 and 8,000.

16. Composition according to claim 9, wherein the at least one polymer dispersion is an aqueous polyacrylate dispersion having a non-volatile content of at least 20%.

17. A process for preparing the composition as defined in claim 1, comprising mixing the various components, optionally diluting with more water, and optionally adjusting the pH with acids or bases.

18. The process according to claim 17, wherein mixing is achieved by pumping through a homogenizer.

19. A method of waterproofing a leather product, the method comprising applying the composition as defined in claim 1 to a pre-tanned leather, tanned leather, pelt, skin, hide, leather intermediate product, or non-finished leather.

20. The method according to claim 19, wherein no metal salts are used as capping agent.

21. Leather, obtained by the method as defined in claim 19, having a good water resistance according to ISO DIN EN ISO 5403-2 and DIN EN ISO 5403-1.

\* \* \* \* \*